United States Patent [19]
Le Clerc de Bussy

[11] 3,876,817
[45] Apr. 8, 1975

[54] ELECTRIC FURNACE FOR MELTING GLASS OR CERAMIC PRODUCTS

[76] Inventor: Jacques Marie Yves Le Clerc de Bussy, Bussy Par Poix, France

[22] Filed: Sept. 27, 1973

[21] Appl. No.: 401,557

[30] Foreign Application Priority Data
Sept. 27, 1972 France .................. 72.34129

[52] U.S. Cl. ................................................ 13/6
[51] Int. Cl. ............................................ C03b 5/02
[58] Field of Search .................................. 13/6

[56] References Cited
UNITED STATES PATENTS
3,085,408  4/1963  Arbeit ................................. 13/6
3,659,029  4/1972  de Bussy ............................. 13/6

Primary Examiner—R. N. Envall, Jr.
Attorney, Agent, or Firm—Holman & Stern

[57] ABSTRACT

Furnace for melting a glass or ceramic product comprising a tank in the center of which is disposed a device for extracting the molten product and surrounded by melting electrodes which form with the device a source of heat for supplying heat to the interior of the tank. The source of heat produces in the bath of product a very high temperature gradient between the center and the periphery of the tank and forms radial convection currents which travel outwardly at the surface of the bath and toward the center near the bottom of the tank. Means are further provided for producing in the bath, in addition to said radial convection currents, a slight movement of giration about the center of the tank which produces a uniform stirring of the radial currents in the bath.

8 Claims, 8 Drawing Figures

PATENTED APR 8 1975 3,876,817

ELECTRIC FURNACE FOR MELTING GLASS OR CERAMIC PRODUCTS

The present invention relates to furnaces for melting glass or ceramic products of the type comprising a tank in the center of which is disposed a device which is provided for extracting the molten product, the device being surrounded with melting electrodes and forming with the electrodes a source of heat for heating the interior of the tank, this source of heat producing in the bath of molten product a very high temperature gradient between the center and the periphery of the tank and forming radial convection currents which travel outwardly, at the surface of the bath, and toward the center, near the bottom of the tank.

The existence of these convection currents permits in particular the refining of the product produced in the furnace while the product travels from the exterior of the tank toward the center. However, experience has shown that in this known furnace the molten product can only be obtained in a homogeneous manner if the radial convection currents do not have the same temperature throughout the furnace. Consequently, due to these differences of the "thermic past" of the product in radial zones defined by these convection currents, the homogeneity of the product taken from the furnace is not as good as might be desired. By "thermic past" is meant the conditions of temperature which have determined the formation and the refinement of the product and the duration of these operations.

An object of the present invention is to provide an improved electric furnace which produces a molten product whose homogeneity is distinctly improved over that obtainable in conventional furnaces of this type.

The invention provides a furnace for melting glass or ceramic products of the type defined hereinbefore, wherein means are provided for producing in the bath of molten product, in addition to the radial convection currents, a slight movement of giration about the center of the tank which produces a uniform stirring of the radial currents in the bath.

Further features and advantages of the invention will be apparent from the ensuing description with reference to the accompanying drawings.

The type of furnace concerned in the present invention comprises, in known manner, a frame on which is placed a tank or vessel which usually has a circular shape. Disposed in the center of this tank is an extracting device surrounded by three melting electrodes which form, with the extracting device, a source of heat necessary for melting the product which must be prepared in the furnace.

In such a furnace, it has been found that the existence of a very high temperature gradient in the bath between the center and the periphery of the tank produces radial convection currents travelling away from the center at the surface of the bath of molten material. These currents have for driving means the thermal pump formed by the melting electrodes and the extracting device, the heat being produced by the Joule effect in the product itself which is electrically conductive. These convection currents, after travelling away from the center adjacent the surface of the bath, descend near the peripheral vertical wall of the tank and thereafter return to the center in travelling in the vicinity of the bottom of the tank.

The refinement of the molten product is achieved when the convection currents move toward the center. Indeed, it is in this path of the current of product that the bubbles produced by the melting of the composition may be separated from the product, these bubbles rising to the surface due to the difference between the density of the product and that of the gases contained in the bubbles.

Experiments have shown that these convection currents travel exclusively in radial planes. In order to demonstrate this phenomenon there may be employed in a bath of glass product a powerful coloring agent which acts as a tracer. This coloring agent, which may be constituted by 5 g of cobalt oxide intimately mixed with 1 kg of the product composition, is disposed on the surface of the molten product at a given point near the edge of the tank. Such an amount of coloring agent melts slowly and it is observed that it is taken into the bath within about 20 minutes. Fifteen minutes after this coloring agent has been placed in the product, there is observed in the continuous stream of glass extracted from the furnace a very thin thread of color.

Figure 1:
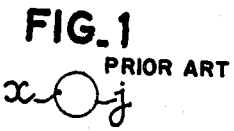
FIGS. 1 to 4 are diagrammatic views illustrating the drawbacks of a known furnace.

FIG. 1 illustrates the appearance of this thread, the figure showing a cross section of the stream $j$ leaving the furnace through the extracting device. The tracer is represented by the point $x$.

Figure 2:

It is then found that about 4 hours are required for a given furnace dimension for the thread to grow in size little by little and then stop and disappear, the thread occupying in the meantime roughly the part of the stream $j$ shown in FIG. 2 by the portion $y$, this figure representing also a cross section of the stream leaving the extracting device. Thus it can be seen that the coloring agent is only mixed with the product in a well-determined zone of the furnace which shows that the convection currents have a distinctly radial path.

As concerns refractory or ceramic products produced in the same type of furnace, and when these products are particularly opaque to infra-red radiation, contributing for a large part to the heating of the bath, which limits the heat exchanges between the various radial zones, it is noticed that the melting surface assumes a triangular shape. This is diagrammatically represented in FIG. 3 which shows in plan a furnace having three electrodes $e$ angularly spaced 120° apart and surrounding an extracting device $d$ with a pouring orifice $o$. It can be seen that the bath has a triangular shape from which it may be concluded that there exist hot zones (arrows f1) and cold zones (arrows f2). These zones correspond respectively to the positions of the three electrodes $e$ and to the spaces between the electrodes. The hot radial zones extend over a larger radial distance, since the supply of heat is higher there than during manufacture of the cold zones.

Although the phenomena described hereinbefore have been observed in products of different types, it may be assumed that they are produced in a more or less pronounced manner with glass products and ceramic products. The lack of homogeneity observed in a product produced in this conventional furnace therefore results from the different "thermal pastes" of the product in the various radial zones of the furnace.

Figure 3:
Figure 4:

FIG. 3 shows that the angular extent of the hot and cold zones is about 60° and that the Joule effect is developed above all between the electrodes e and the extracting device d. On the other hand, in the furnace shown in FIG. 4, which has 6 electrodes, the Joule effect is produced above all between the electrodes themselves, the extracting device no longer being directly concerned — at least from an electical point of view. In this case, the cold or hot zones therefore have an angular extent of about 30°. Moreover, in this furnace, the temperature differences between hot and cold zones is not as high as in the case shown in FIG. 3.

Figure 5:
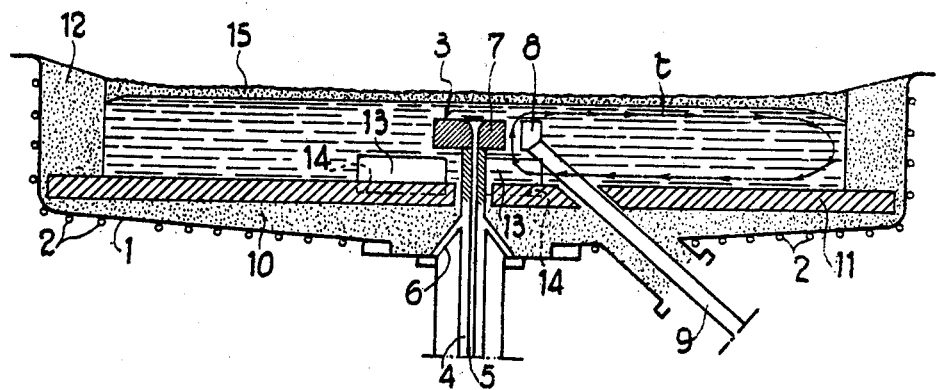
FIG. 5 is a diagrammatic vertical sectional view of a melting furnace according to a first embodiment of the invention.
Figure 6:
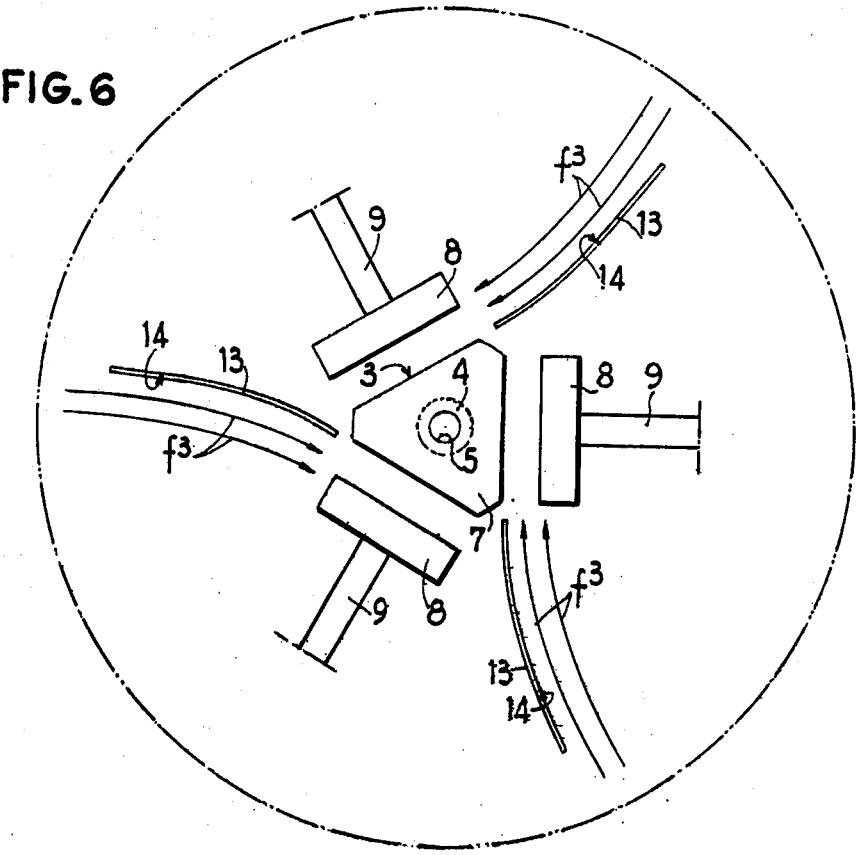
FIG. 6 is a plan view, to an enlarged scale, of the center of the furnace shown in FIG. 5, and FIGS. 7 and 8 are diagrammatic plan and perspective views, respectively, of two other embodiments of the invention.

FIGS. 5 and 6 show a melting furnace constructed in accordance with the invention. This furnace comprises a tank or vessel 1 mounted on a stand (not shown) and made of a material such as copper. The tank 1 is surrounded by a number of cooling coils 2 supplied with suitable cooling liquid such as water. The tank has a circular shape and includes in its center an extracting device 3. The latter comprises a rod 4 of a highly refractory material in which is formed an extracting passage 5 which puts the interior of the tank 1 in communication with the exterior, the product produced and refined being withdrawn continuously through of this passage. The rod 4 is secured to the bottom of the tank 1 by means of a conical skirt portion 6 and carries in its upper end a center block 7 which has, in the illustrated embodiment of a furnace having three electrodes, a triangular shape (FIG. 6). The extracting device 3 is provided with three electrodes 8 carried by electrode rods which extend in a fluidtight manner through the bottom of the tank and are connected to a three-phase supply.

The bottom part of the tank is filled with a refractory material 10 constituted, for example, by a powdered material such as zircon sand on which is placed a slab of refractory material 11. The lateral peripheral wall of the tank is lined with a refractory material 12.

According to the invention, the melting furnace is provided with stirring or agitating means which, in the embodiment shown in FIGS. 5 and 6, comprise three screens or curved plates 13 of a highly refractory metal, such as molybdenum. These screens 13 are placed in grooves 14 formed in the refractory slab 11. The grooves 14 extend roughly radially and are slightly curved so as to be adapted to the curvature of the screens 13.

FIG. 5 shows by the line t carrying arrows the path of the convection currents in the bath of molten product. It can be seen that these currents start between the center block 7 and the electrodes 8 between which a thermal pump is established, which is produced by the heating of the product due to the Joule effect. The currents thereafter flow along the surface of the bath toward the periphery below the layer of composition 15 which is continuously supplied by a distributor (not shown) located above the furnace. At the periphery, the currents travel downwardly toward the bottom of the tank and are at their lowest temperature. Thereafter, they return toward the center of the tank and are once again subjected to the thermal pump. It is in this last path that the molten product is refined.

Because of the screens 13, the convection currents which are propagated in the cold zones (see arrows f3 in FIG. 6) are deviated toward the hotter zones in the region of the spaces between the electrodes and center block so that the product moved by these relatively cold currents is subjected to the heating of the thermal pump in the center so as to be taken up thereafter by the radial convection currents of the corresponding hot zone. Consequently, the product travels not only in the radial convection currents but also in accordance with a certain giration about the center of the furnace which produces the stirring or agitation of the whole of the molten product. In this way, the homogeneity of the product is distinctly improved over that of products issuing from conventional furnaces.

It should be noted that the screens 13 have such height that they do not disturb the movement of the product in the convection currents on the surface of the bath. The height of these screens is preferably roughly one half of the height of the bath of molten product.

The molten product which is moved upwardly in the center of the bath is practically devoid of bubbles, since, as already mentioned, the refining is produced in the convection currents near the bottom of the tank, bubbles being present in a larger number at the periphery. The length of the screens 13 is therefore preferably chosen in such manner that the highly refractory metal is not, or practically not, in contact with bubbles of unrefined product since these bubbles contain mainly harmful oxidizing gases which attack the material of the screens. A length corresponding to about one quarter of the radius of the furnace is the preferred value.

FIG. 6 shows in particular that the screens 13 are not in contact with the electrical elements of the furnace and they do not participate in the supply of energy in the furnace, which also prolongs their life.

Figure 7:
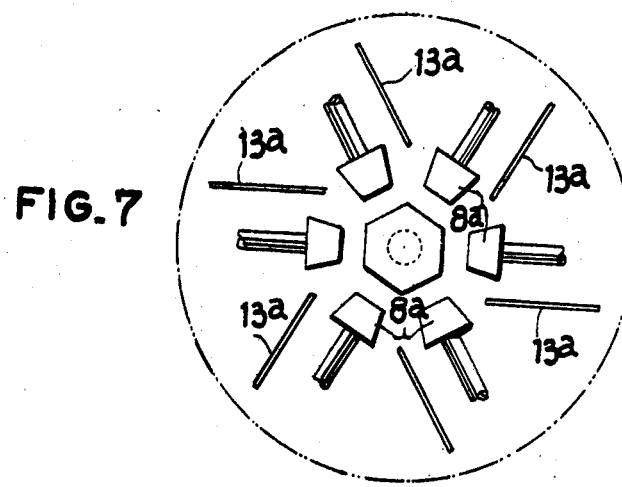

FIG. 7 shows a diagram of a furnace having six electrodes 8a in which the screens 13a are provided near each electrode. In this modification, the screens are constituted by planar plates which are disposed vertically and parallel to the corresponding radial planes of the furnace. These radial planes are preferably those in which the axes of the rods of the electrodes 8a are contained. It will be understood that the screens 13a have the same effect as the screens 13 of the embodiment described hereinbefore, that is to say, they cause the product to move from the cold zones toward the hot zones of the bath of molten product.

Figure 8:
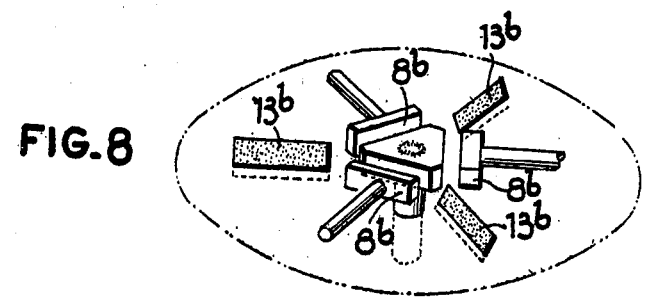

FIG. 8 shows a modification of the invention in respect of a furnace having three electrodes 8b. In this embodiment, there are provided screens 13b formed by planar plates disposed on radii of the furnace but inclined to the vertical. These screens 13b are also placed near the center of the furnace and between two adjacent electrodes 8b.

Having now described my invention what I claim as new and desire to secure by Letters Patent is:

1. A furnace for melting a glass or ceramic product, comprising a tank, a device which is located substantially in the center of the tank for extracting the molten product, product-melting electrodes surrounding the extracting device and forming with the device a source of heat for supplying heat to the interior of the tank, said source of heat producing in the bath of molten product a very high temperature gradient between the center and the periphery of the tank by forming radial convection currents which travel outwardly, at the surface of the bath of molten product, and toward the center, near the bottom of the tank, and means for producing in the bath of molten product, in addition to said radial convection currents, a slight movement of giration substantially about the center of the tank which produces a uniform stirring of said radial currents in the bath, said means comprising a refractory layer disposed in the bottom of the tank and screens fixed to the refractory layer, the arrangement of the screens being such that the screens deviate said convection currents from their return path toward the center of the furnace.

2. The furnace claimed in claim 1, wherein said screens are placed in convection currents travelling in radial zones of the furnace, in which radial zones the temperature is lower than the temperatures of adjacent zones which are directly affected by the supply of heat energy produced by said electrodes.

3. The furnace claimed in claim 1, wherein said screens are constituted by plates of a highly refractory metal and disposed in grooves provided in said refractory layer.

4. The furnace claimed in claim 3, wherein said highly refractory metal is molybdenum.

5. The furnace claimed in claim 3, wherein said plates are curved and disposed vertically.

6. A furnace as claimed in claim 3, wherein said plates are vertical and parallel to radial planes of the tank.

7. A furnace as claimed in claim 6, wherein said radial planes are planes in which are located axes of rods of the electrodes.

8. A furnace as claimed in claim 3, wherein said plates are planar and disposed radially but inclined with respect to the vertical.

* * * * *